United States Patent [19]

Inoue

[11] 4,355,622
[45] Oct. 26, 1982

[54] AIR/FUEL MIXTURE HEATING DEVICE FOR INTERNAL COMBUSTION ENGINE

[75] Inventor: Mitsumasa Inoue, Yokohama, Japan

[73] Assignee: Nissan Motor Co., Ltd., Yokohama, Japan

[21] Appl. No.: 164,906

[22] Filed: Jul. 1, 1980

[30] Foreign Application Priority Data

Jul. 18, 1979 [JP] Japan ............................ 54-99039[U]

[51] Int. Cl.³ ............................................. F02M 31/00
[52] U.S. Cl. .................................... 123/548; 123/547; 261/144; 48/180 H
[58] Field of Search ................ 123/548, 547; 261/144, 261/145; 48/180 H

[56] References Cited

U.S. PATENT DOCUMENTS

| 1,676,955 | 7/1928 | Kemp | 123/548 |
| 2,012,525 | 8/1935 | Turner | 123/548 |
| 3,892,214 | 7/1975 | Heidacker | 123/548 |
| 4,086,892 | 5/1978 | Marsee | 123/548 |
| 4,108,124 | 8/1978 | Nakagawa | 261/145 |

Primary Examiner—Donald H. Lazarus

[57] ABSTRACT

An air/fuel mixture heating device for an internal combustion engine comprises a riser portion located at a relatively high position in the riser space in an intake manifold and having air/fuel mixture heating means and a barrier formed on a circumference of a riser surface of the riser portion, and an intake air inlet arranged in opposition to the riser surface for introducing intake air to the riser surface, thereby promoting the atomization of fuel particles by heating by the riser surface and by causing the fuel to pass by the barrier to distribute the fuel uniformly to respective cylinders of the engine.

1 Claim, 6 Drawing Figures

FIG.1
_PRIOR ART_
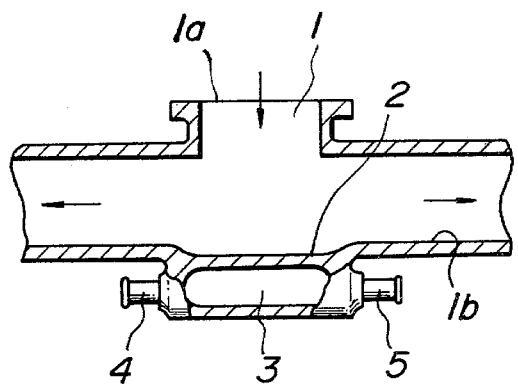
FIG.2 _PRIOR ART_
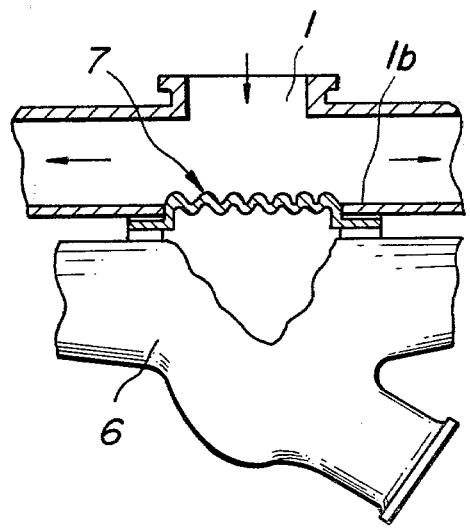

AIR/FUEL MIXTURE HEATING DEVICE FOR INTERNAL COMBUSTION ENGINE

BACKGROUND OF THE INVENTION

1. Field of the Invention

The present invention relates to an air/fuel mixture heating device for an internal combustion engine for heating air/fuel mixture to improve properties and conditions of mixtures.

2. Description of the Prior Art

It has been well known that an intake mixture for a spark ignition internal combustion engine is heated to promote the atomization of fuel, thereby improving the performance of the engine, particularly, at low and middle rotating speed ranges. For this purpose, many modern internal combustion engines for automobiles have been equipped with air/fuel mixture heating devices of various kinds.

Most of the heating devices used are as shown in FIGS. 1 and 2.

FIG. 1 illustrates so-called a "hot water heating" device, wherein a hot water jacket is provided adjacent to a slightly concaved riser portion 2 immediately below a carburetor mounting portion 1a of an intake manifold 1. The cooling water for an engine is supplied to the hot water jacket 3 to heat the air/fuel mixture through the riser portion 2. The hot water jacket 3 has an inlet 4 and an outlet 5 for the hot water.

FIG. 2 shows a heating device utilizing the heat in the exhaust gas from an engine, wherein a corrugated stove plate 7 is arranged at a location corresponding to the riser portion, to which is connected a part of an exhaust manifold 6 for heating the air/fuel mixture through the stove plate by the heat of the exhaust gas.

With both the heating devices hitherto used, the riser portion is formed continuously and substantially flush with the bottom surface 1b of a branch of the intake manifold, so that the fuel flowing on walls of the intake manifold under liquid condition cannot be sufficiently atomized.

Bad effects of the liquid fuel flowing on the walls of the intake manifold on the engine performance have been recognized by those skilled in the art. Particularly, it has been noticed that the liquid fuel flowing on the walls of the intake manifold makes unstable the control of the air and fuel ratio to cause a problem in exhaust gas purification required for internal combustion engines for recent automobiles.

Namely, with the system of purifying the injurious substances (HC, CO, NOx and the like) in exhaust gases, for example, by means of a three way catalyst, a precise control of the air and fuel ratio is absolutely necessary in order that the three way catalyst reacts effectively. For this purpose a feedback control device has been practically used for feedback controlling fuel supply means such as carburetors with the aid of detected oxygen concentrations in the exhaust gases. In this case, however, even if the carburetor is feedback controlled to obtain an optimum air and fuel ratio, the fuel flowing on the walls causes a delayed response and variation in actual air and fuel ratios of mixtures sucked in respective cylinders of the engine.

With the air/fuel mixture heating devices of the prior art, the atomization of the liquid fuel flowing on the walls is not sufficient so that the liquid fuel extends substantially all over the walls in the intake air pipe, which unduly increases the above delayed response to make the purification of the exhaust gases insufficient.

SUMMARY OF THE INVENTION

It is an object of the invention to provide an improved air/fuel mixture heating device for an internal combustion engine which eliminates all the drawbacks of the prior art.

It is another object of the invention to provide an air/fuel mixture heating device for an internal combustion engine, which comprises a riser portion located at a relatively high position in the riser space in the intake manifold and having intake air heating means and a barrier formed on a circumference of the riser portion, thereby improving the property and condition of mixture for the engine.

In order that the invention may be more clearly understood, preferred embodiments will be described, by way of example, with reference to the accompanying drawings.

BRIEF DESCRIPTION OF THE DRAWINGS

FIG. 1 is a partial sectional view of an air/fuel mixture heating device of the prior art as mentioned above;

FIG. 2 is a partial sectional view of another air/fuel mixture heating device of the prior art as mentioned above;

FIG. 6b is a sectional front view of the embodiment shown in FIG. 6a; and FIG. 6c is a sectional view taken along the line VIc—VIc in FIG. 6a.

DETAILED DESCRIPTION OF THE PREFERRED EMBODIMENT

Figure 3:
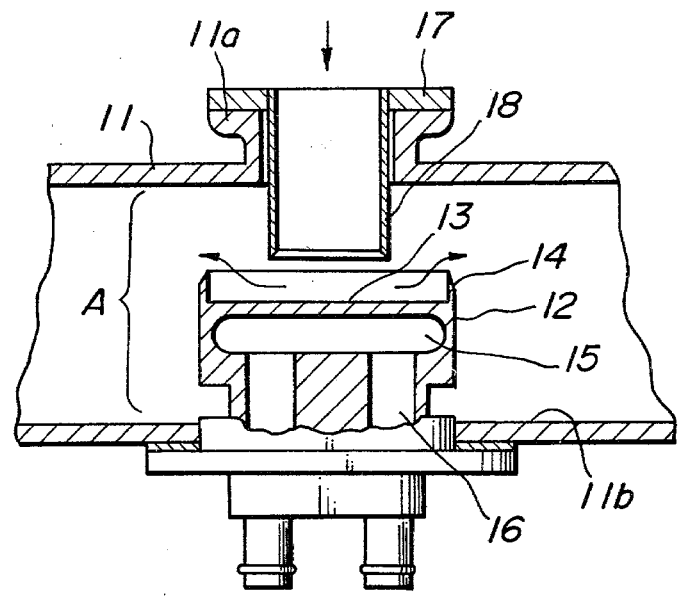
FIG. 3 is a partial sectional view of the first embodiment of the air/fuel mixture heating device according to the invention.

FIG. 3 illustrates a first embodiment of the invention in partial cross-section arranged in an intake manifold 11. In this embodiment, a circular riser 12 is provided at a relatively high location in a riser space A in the intake manifold 11, that is, above a bottom wall 11b of the intake manifold 11.

The riser 12 is formed with a riser surface 13 in opposition to a fuel supply portion (not shown) and formed on a circumference of the riser surface with a barrier 14 whose end has a wedge-shaped cross-section.

The riser 12 comprises on the opposite side of the riser surface 13 a hot water jacket 15 as air/fuel mixture heating means which is communicated with hot water openings 16 for supplying and exhausting the engine cooling water.

An air inlet pipe 18 is fitted in a fuel supply means mounting portion (carburetor, fuel injection nozzle or the like mounting portion) 11a of the intake manifold 11 through an insulator 17.

The air inlet pipe 18 is arranged with its downstream opening end somewhat above and in opposition to the riser 13. The air inlet pipe 18 may be integrally formed with the intake manifold 11. The diameter of the riser surface 13 is larger than that of the air inlet pipe 18.

With this arrangement, the mixture formed in the fuel supply portion (not shown) is introduced through the air inlet pipe 18 into the intake manifold 11, during which relatively fine light particles of mist fuel in the mixture flow together with the intake air toward the outer circumference of the riser 12, while relatively large heavy particles of mist fuel impinge against the riser surface 13.

As the riser surface 13 has been heated by the engine cooling water supplied into the hot water jacket 15, the liquid fuel attached to the riser surface 13 progressively vaporizes or partly flows on the riser surface 13 while being heated. This flowing liquid fuel is heated by the riser surface to be progressively vaporized and simultaneously brought or blown off toward the outer circumference (barrier 14) of the riser 12 in succession so as to impinge against the end of the barrier 14 to be atomized.

The mixture flowing toward the outer circumference of the riser 12 is uniformly distributed to respective cylinders, because it is effectively atomized in this manner.

Although there is some liquid fuel flowing on the riser surface 13, its smaller area than that of the prior art arrangements sufficiently prevents the lowering of the responsiveness in control of the air and fuel ratio.

Figure 4:
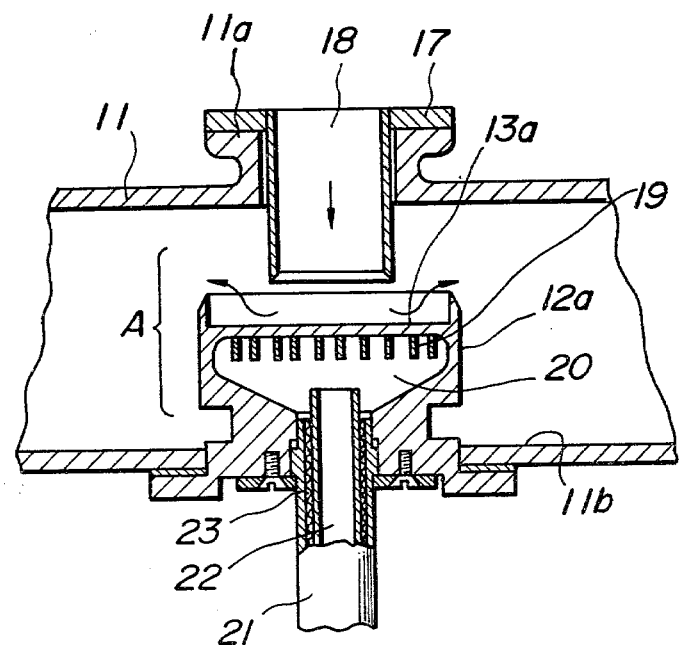
FIG. 4 is a partial sectional view of the second embodiment of the device according to the invention.

Referring to FIG. 4 illustrating a second embodiment of the invention, utilizing a heat pipe as air/fuel mixture heating means, a riser 12a comprises a radiation chamber 20 provided therein with a number of radiation fins 19 and connected to one end of the heat pipe 21.

The other end (not shown) of the heat pipe 21 which is a high temperature section (heat receiving section) is arranged in an exhaust gas passage of an engine. The heat pipe 21 includes therein a central passage 22 surrounded by a wick portion 23 and enclosing therein a liquid medium for heat transmission.

In this case, the medium is heated at the high temperature section to be vaporized. The vaporized medium flows through the central passage 22 into the radiation chamber 20 where the medium is heat exchanged through the riser surface 13a with the intake air to be heated. As a result of the heat exchange, the medium is cooled so as to be condensed to the liquid condition, which liquid medium then returns to the high temperature section through the wick portion 23.

According to this embodiment, the heat pipe 21 is used as air/fuel mixture heating means utilizing the heat in the exhaust gases, so that the riser surface 13a is heated to high temperatures sufficient to achieve the effective intake air heating and fuel vaporization. It is preferable to keep the temperature of the riser surface in the order of 100°–200° C.

Figure 5:
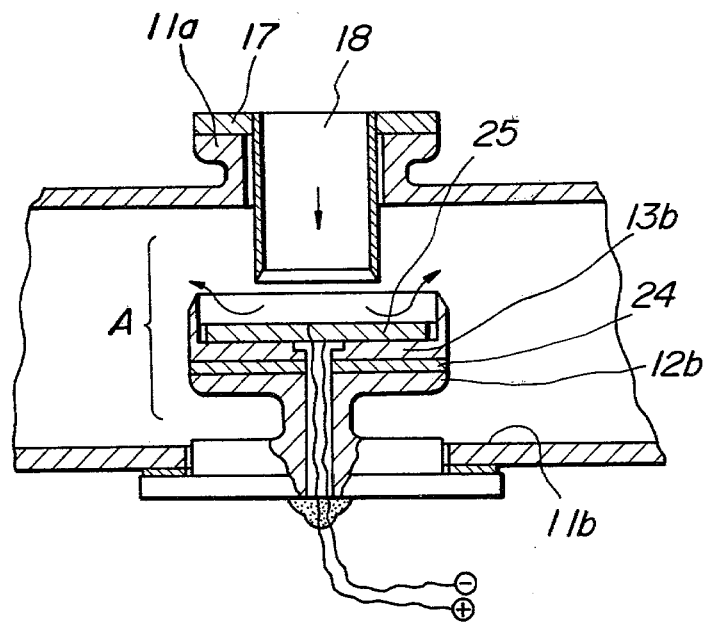
FIG. 5 is a partial sectional view of the third embodiment of the device according to the invention.

Referring to FIG. 5 illustrating a third embodiment utilizing an electric heater as air/fuel mixture heating means, a riser 12b is formed through an insulator 24 with a riser surface 13b, substantially all over which surface is arranged an electric heater 25 such as for example a heater having a positive temperature coefficient, which is supplied with power from a power source such as a battery.

According to this embodiment, therefore, no matter how an engine may operate, it will always be possible to obtain stable air/fuel mixture heating. In case that the air/fuel mixture heating is not required (for example, when the engine operates at a high speed), it is possible to stop the heating easily to improve the filling efficiency of the mixture.

Figure 6A:
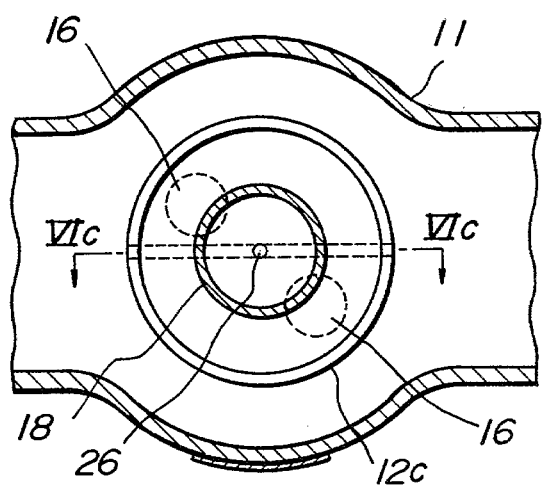
FIG. 6a is a sectional plan view of the fourth embodiment of the device according to the invention.
Figure 6B:
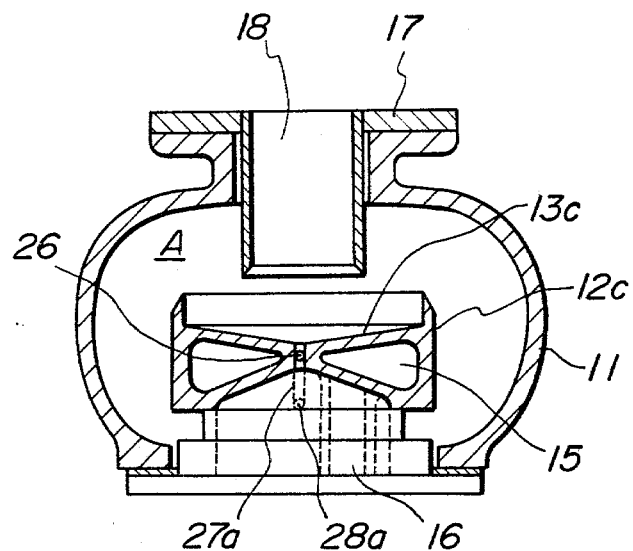
Figure 6C:
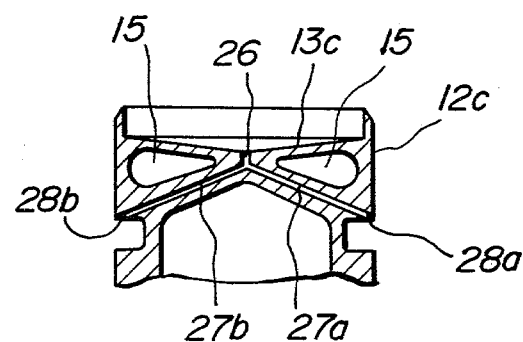

FIGS. 6a–6c illustrate a fourth embodiment of the invention, wherein the fuel which remains on the riser surface is permitted to escape out of the riser through a bypath so as to improve the starting performance of an engine.

As shown in FIGS. 6a–6c, a riser 12c of this embodiment includes a riser surface 13c slowly inclined downwardly toward its center where there is provided a bypath inlet 26 communicating with bypaths 27a and 27b which are oblique toward openings 28a and 28b respectively opening at locations in symmetry (FIGS. 6a and 6c). The riser surface 13c is heated by the engine cooling water through hot water jackets 15.

With the above arrangement, the liquid fuel flowing on the riser surface 13c, which is formed when the engine starts, flows through the bypath inlet 26 into both the bypaths 27a and 27b and directly into branches for respective cylinders, thereby rapidly supplying the fuel to the respective cylinders to improve the starting performance of the engine.

As both the bypaths 27a and 27b are inclined in symmetry toward the lower end of the outer circumference of the riser 12c, the fuel supply to the respective cylinders of the engine when it is started is uniformly and smoothly effected, when if a vehicle having the engine installed has been parked inclined forwardly or backwardly.

As can be seen from the above explanation, the air/fuel mixture heating device according to the invention comprises a riser having air/fuel mixture heating means and a riser surface formed on its circumference with a barrier at a relatively higher position in the riser space downstream of the fuel supply section in an engine intake manifold, against which riser surface the mixture is caused to flow through an intake inlet, thereby promoting the atomization of the fuel particles by heating by the riser surface and by an action to which the fuel is subjected when it passes by the barrier and therefore makes it possible to distribute the fuel uniformly to respective cylinders of an engine.

In addition, according to the invention, as the liquid fuel flowing on a wall exists only on the riser surface, there is no response delay and variation in air and fuel ratio of the mixture supplied to respective cylinder of the engine, so that the air and fuel ratio is stably maintained, thereby in conjunction with the above effects, improving the engine performance and particularly the efficiency and reliability of the exhaust gas purification system utilizing the three way catalyst.

It is further understood by those skilled in the art that the foregoing description is of preferred embodiments of the disclosed device and that various changes and modifications may be made in the invention without departing from the spirit and scope thereof.

What is claimed is:

1. An air/fuel mixture heating device for an internal combustion engine, arranged in an intake manifold including fuel supply means upstream of a riser space in said intake manifold, comprising: a riser extending substantially vertically into said intake manifold to a relatively high position in said riser space and having a riser surface slowly inclined downwardly toward its center substantially opposite to a carburetor outlet for introducing a fuel air mixture to the riser surface, said riser being formed at a circumference of said riser surface with a barrier for collecting condensed fuel, a hot water jacket through said riser below said riser surface for passing engine cooling water therethrough to heat condensed fuel in said barrier, and with paths through said riser for the condensed fuel.

* * * * *